United States Patent
Hutchens, III et al.

(10) Patent No.: US 11,034,223 B2
(45) Date of Patent: Jun. 15, 2021

(54) COVER INCLUDING A MONOLITHIC COATING

(71) Applicant: UNDERCOVER, INC., Ann Arbor, MI (US)

(72) Inventors: Jason Dale Hutchens, III, Ann Arbor, MI (US); Timothy James Spice, Ann Arbor, MI (US); James Gerard Quintus, Ann Arbor, MI (US); Robert C. Joslyn, Ann Arbor, MI (US)

(73) Assignee: UNDERCOVER, INC., Ann Arbor, MI (US)

( * ) Notice: Subject to any disclaimer, the term of this patent is extended or adjusted under 35 U.S.C. 154(b) by 69 days.

(21) Appl. No.: 16/697,359

(22) Filed: Nov. 27, 2019

(65) Prior Publication Data

US 2020/0094661 A1 Mar. 26, 2020

Related U.S. Application Data

(62) Division of application No. 15/955,402, filed on Apr. 17, 2018, now Pat. No. 10,525,803.

(Continued)

(51) Int. Cl.
*B60R 19/34* (2006.01)
*B60J 7/14* (2006.01)
(Continued)

(52) U.S. Cl.
CPC ........... *B60J 7/141* (2013.01); *B01J 37/0215* (2013.01); *B32B 27/08* (2013.01); *B32B 27/12* (2013.01);
(Continued)

(58) Field of Classification Search
CPC .. B60J 7/141; B60J 7/198; B60J 7/085; B60P 7/02; B60P 7/04; B65D 43/164;
(Continued)

(56) References Cited

U.S. PATENT DOCUMENTS 4,313,636 A * 2/1982 Deeds ...................... B60J 7/141
160/93
4,418,954 A * 12/1983 Buckley ................... B60J 7/141
296/100.09

(Continued)

FOREIGN PATENT DOCUMENTS

WO 2016/022164 A1 2/2016

*Primary Examiner* — Kiran B Patel
(74) *Attorney, Agent, or Firm* — The Dobrusin Law Firm, P.C.

(57) ABSTRACT

A foldable tonneau system comprising: (a) a plurality of frames, each of the plurality of frames include a panel region and a hinge region; (b) a plurality of panels each connected to one or more of the plurality of frames via the panel region; (c) a plurality of hinges that extend between and into the hinge region of a first of the plurality of frames and the hinge region of a second of the plurality of frames and connect the first of the plurality of frames to the second of the plurality of frames so that two of the plurality of panels are movable relative to each other; and (d) a coating that covers all or a portion of the plurality of panels, all or portion of the plurality of frames, and a connection region where each of the plurality of panels connect to the one of the plurality of frames at the panel region so that fluid is prevented from entering the connection region.

20 Claims, 4 Drawing Sheets

Related U.S. Application Data

(60) Provisional application No. 62/490,413, filed on Apr. 26, 2017.

(51) Int. Cl.
    *B60J 10/90*     (2016.01)
    *B01J 37/02*     (2006.01)
    *B32B 27/08*     (2006.01)
    *B32B 27/12*     (2006.01)

(52) U.S. Cl.
    CPC ......... *B60J 10/90* (2016.02); *B32B 2307/536* (2013.01); *B32B 2307/7265* (2013.01)

(58) Field of Classification Search
    CPC . F16C 11/06; F16D 3/16; F16L 27/02; F16M 11/12
    See application file for complete search history.

(56) References Cited

U.S. PATENT DOCUMENTS

| | | | |
|---|---|---|---|
| 4,861,092 A * | 8/1989 | Bogard | B60J 7/141 296/100.09 |
| 5,427,428 A * | 6/1995 | Ericson | B60J 7/141 160/231.1 |
| 5,595,417 A | 1/1997 | Thoman et al. | |
| 5,636,893 A * | 6/1997 | Wheatley | B60J 7/141 16/354 |
| 5,653,491 A * | 8/1997 | Steffens | B60J 7/141 160/187 |
| 5,795,011 A | 8/1998 | Flentge | |
| 5,857,729 A * | 1/1999 | Bogard | B60J 7/1621 296/100.09 |
| 5,931,521 A * | 8/1999 | Kooiker | B60J 7/141 296/100.09 |
| 5,961,173 A * | 10/1999 | Repetti | B60J 7/141 296/100.01 |
| D421,736 S * | 3/2000 | Bogard | D12/401 |
| 6,082,806 A * | 7/2000 | Bogard | B60J 7/141 296/100.06 |
| 6,221,290 B1 | 4/2001 | Waddington et al. | |
| 6,352,296 B1 * | 3/2002 | Kooiker | B60J 7/141 296/100.06 |
| 6,702,359 B2 * | 3/2004 | Armstrong | B60J 7/08 296/100.02 |
| 6,719,363 B2 * | 4/2004 | Erlandsson | B60R 13/013 16/237 |
| 6,948,761 B2 | 9/2005 | Haack et al. | |
| 7,157,388 B2 | 1/2007 | Langley et al. | |
| 7,442,441 B2 | 10/2008 | Peeler et al. | |
| 7,484,788 B2 | 2/2009 | Calder et al. | |
| 8,480,154 B2 * | 7/2013 | Yue | B60J 7/141 296/100.07 |
| 8,814,249 B2 | 8/2014 | Rossi | |
| 8,960,795 B2 | 2/2015 | Sap | |
| 9,004,571 B1 * | 4/2015 | Bernardo | B60J 7/141 296/100.03 |
| 9,039,066 B1 * | 5/2015 | Yue | B60J 7/141 296/100.09 |
| 9,211,834 B2 | 12/2015 | Facchinello et al. | |
| 9,482,039 B1 * | 11/2016 | Xu | B60P 7/04 |
| 9,623,737 B2 | 4/2017 | Facchinello et al. | |
| 9,738,143 B2 | 8/2017 | Weltikol et al. | |
| 9,815,358 B1 * | 11/2017 | Quintus | B60J 7/141 |
| 9,895,963 B1 * | 2/2018 | Spencer | B60J 7/141 |
| 10,112,466 B2 * | 10/2018 | Facchinello | B60J 7/196 |
| 10,118,471 B1 * | 11/2018 | White | B60R 5/045 |
| 10,245,928 B1 * | 4/2019 | Facchinello | E05D 3/02 |
| 10,384,522 B2 * | 8/2019 | Yilma | B60J 7/198 |
| 2001/0035664 A1 | 11/2001 | Steffens | B60J 7/141 296/100.09 |
| 2002/0145299 A1 * | 10/2002 | Henderson | B60P 1/43 296/61 |
| 2004/0195857 A1 * | 10/2004 | Chverchko | B60J 7/1621 296/100.07 |
| 2006/0012211 A1 * | 1/2006 | Keller | B60J 7/141 296/100.09 |
| 2007/0210609 A1 * | 9/2007 | Maimin | B60P 7/02 296/100.09 |
| 2009/0146449 A1 * | 6/2009 | Steffens | B60J 7/141 296/100.07 |
| 2011/0101727 A1 * | 5/2011 | Rusher | B60J 7/141 296/100.18 |
| 2011/0241372 A1 * | 10/2011 | Kusu | B60R 5/048 296/24.43 |
| 2014/0152046 A1 * | 6/2014 | Facchinello | B60J 7/141 296/100.06 |
| 2015/0061315 A1 * | 3/2015 | Facchinello | B60P 7/02 296/100.07 |
| 2015/0165960 A1 * | 6/2015 | Yue | B60J 7/141 296/100.09 |
| 2016/0100376 A1 | 4/2016 | Siegel et al. | |
| 2016/0114666 A1 * | 4/2016 | Xu | B60J 7/141 296/100.07 |
| 2016/0167592 A1 * | 6/2016 | Williams | B60R 13/08 296/37.6 |
| 2016/0176448 A1 * | 6/2016 | Germano | B60J 7/141 296/100.09 |
| 2016/0200375 A1 * | 7/2016 | Kerr, III | B60J 7/141 296/100.07 |
| 2016/0200376 A1 * | 7/2016 | Kerr, III | B60J 7/198 296/100.07 |
| 2016/0340949 A1 * | 11/2016 | Xu | E05D 3/125 |
| 2017/0001499 A1 * | 1/2017 | Facchinello | B60J 7/106 |
| 2017/0210214 A1 * | 7/2017 | Weltikol | B60J 7/198 |
| 2017/0291478 A1 * | 10/2017 | Hall | B60J 7/141 |
| 2019/0061498 A1 * | 2/2019 | DeLong | B60J 7/141 |
| 2019/0084391 A1 * | 3/2019 | Yilma | B60P 7/02 |
| 2019/0092149 A1 * | 3/2019 | Facchinello | B60J 7/141 |
| 2019/0100088 A1 * | 4/2019 | Facchinello | B60J 10/00 |

* cited by examiner

COVER INCLUDING A MONOLITHIC COATING

FIELD

The present teachings relate to a tonneau system that includes a monolithic coating over the tonneau system and more specifically a tonneau system with a plurality of tonneau sections that are foldable relative to each other by a hinge and a monolithic coating that covers the tonneau sections, the hinges, or both to prevent fluid from penetrating the tonneau system.

BACKGROUND

Tonneau systems cover an open area of a vehicle and generally cover an open area of a pick-up truck (i.e., a bed). Multiple different types of tonneau systems are available, however, many of these systems have an exterior where joints, hinges, or elastomeric hinges are visible. These joints, hinges, or elastomeric hinges may prevent all of the panels from being painted or the tonneau system from having a continuous exterior surface such that the tonneau system may not have a clean exterior surface. These systems include a plurality of panels that are folded one on top of another and the panels rotate about the hinges. The hinges, joints, or elastomeric hinges may require one or more connection areas where fluids may penetrate so that the fluids may extend into the truck bed. Items may be stored in the truck bed that are intended to stay dry such that an introduction of a fluid such as water into the truck bed may potentially damage the items or require the items to be dried before the items are used.

Examples of tonneau systems and attempts to create covers that resist fluid penetration are found in U.S. Pat. Nos. 5,595,417; 5,636,893; 5,795,011; 6,221,290; 6,948,761; 7,157,388; 7,442,441; 7,484,788; 8,960,765; and 9,211,834 all of which are expressly incorporated herein by reference for all purposes. It would be desirable to have a coating that covers the panel and the frame to create a fluid barrier over a connection between the frame and the panel. What is needed is a coating that extends over the panel and a hinge in a frame and forms a fluid barrier over the panel and the hinge. It would be desirable to have a coating that when applied over a hinge permits movement of the hinge without the coating being damaged and prevents fluid penetration when in a stored position. What is needed is a coating that bonds to and resists fluid penetration through multiple types of material. It would be attractive to have a coating that is sufficiently strong to protect panels, a hinge, and a frame from damage, but is sufficiently flexible to move with the hinge.

SUMMARY

The present teachings seek to help solve one or more of the problems/issues disclosed above. The present teachings are particularly directed to a coating that extends over a panel and a frame and/or hinge along a top side of a tonneau system. The present teachings are directed to a coating that protects the tonneau cover and prevents fluid from penetrating the tonneau system.

Accordingly, pursuant to one aspect of the present teachings provides: a foldable tonneau system comprising: (a) a plurality of frames, each of the plurality of frames include a panel region and a hinge region; (b) a plurality of panels each connected to one or more of the plurality of frames via the panel region; (c) a plurality of hinges that extend between and into the hinge region of a first of the plurality of frames and the hinge region of a second of the plurality of frames and connect the first of the plurality of frames to the second of the plurality of frames so that two of the plurality of panels are movable relative to each other; and (d) a coating that covers all or a portion of the plurality of panels, all or portion of the plurality of frames, and a connection region where each of the plurality of panels connect to the one of the plurality of frames at the panel region so that fluid is prevented from entering the connection region.

The present teachings provide: a foldable tonneau system comprising: a method comprising: (a) inserting one of a plurality of panels into a panel region of one of a plurality of frames; (b) inserting a first end of one of a plurality of hinges into a hinge region of the one of the plurality of frames; (c) inserting a second end of the one of the plurality of hinges into a hinge region of a second of the plurality of frames; and (d) applying a coating over the one of the plurality of panels and all or a portion of the one of the plurality of hinges and all or a portion of the second of the plurality of frames.

The present teachings provide: a foldable tonneau system comprising: (a) a plurality of frames, each of the plurality of frames include a panel region and a hinge region; (b) a plurality of panels each connected to one or more of the plurality of frames via the panel region; (c) a plurality of hinges that extend between and into the hinge region of a first of the plurality of frames and the hinge region of a second of the plurality of frames and connect the first of the plurality of frames to the second of the plurality of frames so that two of the plurality of panels are movable relative to each other; and (d) a coating that covers all or a portion of the plurality of panels, all or portion of the plurality of frames, all or a portion of the plurality of hinges, or a combination thereof; wherein the coating includes a cross-linked elastomeric polymer including urea linkages.

The present teachings provide a coating that covers the panel and the frame to create a fluid barrier over a connection between the frame and the panel. The present teachings a coating that extends over the panel and a hinge in a frame and forms a fluid barrier over the panel and the hinge. The present teachings provide a coating that extends over the panel and a hinge in a frame and forms a fluid barrier over the panel and the hinge. The present teachings provide a coating that when applied over a hinge permits movement of the hinge without the coating being damaged and prevents fluid penetration when in a stored position. The present teachings provide a coating that bonds to and resists fluid penetration through multiple types of material. The present teachings provide a coating that is sufficiently strong to protect panels, a hinge, and a frame from damage, but is sufficiently flexible to move with the hinge.

DETAILED DESCRIPTION

Figure 1:
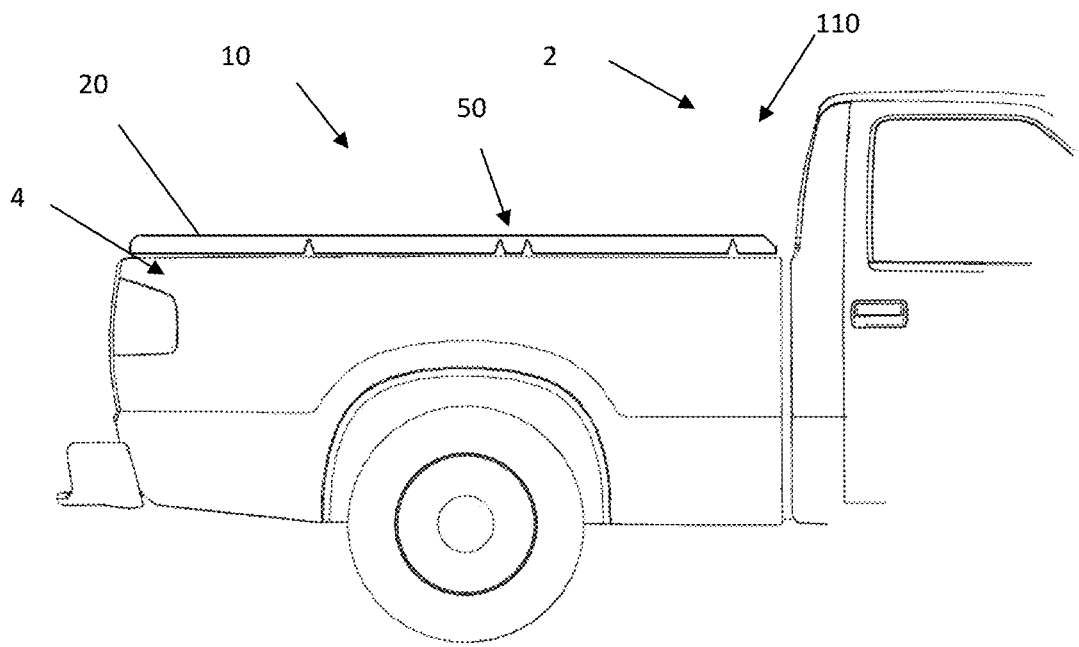
FIG. 1 is a side view of a tonneau cover on a vehicle with the tonneau cover being in the closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The foldable tonneau system (tonneau system) functions to cover an open area and prevent fluid, debris, dirt, or a combination thereof form entering the open area (e.g., a bed or cargo box of a vehicle such as a pick-up truck, and hereinafter "bed"). The tonneau system may cover a bed of any vehicle (e.g., a pickup, El Camino). The tonneau system may function to lock a bed so that items may be stored within the bed. For example, when the tonneau system is in a closed position the tonneau system may close the bed of a vehicle and preferably a bed of a truck. The tonneau system may be collapsible (e.g., movable between a closed position and a stored position) so that items may be placed within the bed without interference from the tonneau system. The foldable tonneau system may be located within a single plane when the tonneau system is in the closed position. The tonneau system may be a plurality of sections that are folded upon themselves to move to a stored position. The tonneau system may fold upon itself to expose the bed. The tonneau system may include one or more tonneau sections and preferably a plurality of tonneau sections.

The tonneau sections (i.e., section) function to connect together to create one contiguous surface. The tonneau sections may lock together. The tonneau sections may be longitudinally movable, rotationally movable, or both relative to other tonneau sections. The tonneau sections when in a closed position may prevent fluid, debris, dirt, or a combination thereof from entering a bed. The tonneau sections may be separate pieces. The tonneau sections may be connected together by a hinge, an outer covering, or both. The tonneau sections may be connected together by a cover that is flexible so that one tonneau section is movable relative to another tonneau section. The tonneau sections may include a frame. The tonneau sections may include one or more frame members. The one or more frame members may extend along a length of each section, form a perimeter of the foldable tonneau system, or both. The tonneau sections may be free of a frame. The tonneau sections may be a panel connected to a frame. A plurality of tonneau sections may be connected together by one or more hinges. The panels, frame, or both of each tonneau section may include an outer covering. The outer covering may have some elastomeric properties that allow one tonneau section to be longitudinally moved relative to another tonneau section. The outer covering may prevent water from penetrating between the tonneau sections in the closed position, extended position, stored position, or a combination thereof. The cover may extend over more than one tonneau section. The cover may extend from an end of a tonneau section to another end of a tonneau section so that a gap between the tonneau sections are covered. Preferably, the outer covering only covers the panels of the tonneau sections.

The one or more panels when laid flat function to cover a bed of a vehicle. The one or more panels may extend from a driver side to a passenger side of a bed. The one or more panels when in series may form a plane. The one or more panels may be a single layer. Preferably, each panel may be a plurality of layers connected together. The one or more panels may include a core layer, a covering on a first side, a covering on a second, side, or a combination thereof. The one or more panels may include a top skin material and a bottom skin material with a high tensile strength and a lightweight core material that when combined together create a structure with a high flexural strength. The flexural strength may be about 2500 MPa or less, about 1500 MPa or less, about 1000 MPa or less, or about 750 MPa or less. The flexural strength may be about 10 MPa or more, preferably about 20 MPa or more, more preferably about 50 MPa or more, even more preferably about 100 MPa, or most preferably about 250 MPa or more. For example, an uncoated panel may have a flexural strength of about 16 MPa and a coated panel may have a flexural strength of about 30 MPa. The panels may be made of a sheet moulding compound. The panels may be made of a polymer, foam, metal, aluminum, titanium, polystyrene, expanded polystyrene, acrylonitrile butadiene styrene (ABS), or a combination thereof. The panels may be made of an open cell foam, a closed cell foam, or a combination of both. Preferably, the panels are made of aluminum skins with an expanded polystyrene material core. The one or more panels may include a core layer, a covering on a first side (e.g., a skin), a covering on a second, side, or a combination thereof.

The one or more panel cores may function to provide structural rigidity of the panel. The one or more panel cores may function to extend from a driver side to a passenger side, from a front end to a rear end, extend part of a distance between a front end and a rear end, or a combination thereof. The panel core may be substantially rigid. For example, the panel core may be able to support a weight of about 10 Kg or more, about 25 Kg or more, about 50 Kg. or more, or even 100 Kg. or more. The panel core may be able to support a weight of about 250 Kg. or less or about 200 Kg or less. The panel core may include one or more reinforcements. For example, the panel core may include one or more pieces of metal that are included within a molded material, a molding compound, a foam, a polymer, or a combination thereof. The one or more panel cores may be fluid resistant. The one or more panel cores may resist fluid from passing through the panel. The panel core may not be fully hydrophobic, scratch resistant, dent resistant, or a combination thereof and may include one or more skins to protect the panel core, provide fluid resistance, or both.

The one or more skins may be an outer layer that functions to protect the panel core, resist fluid from entering the bed or cargo box, create a dent resistant layer, create a scratch resistant layer, or a combination thereof. The one or more skins may be a hardened material that may be substantially impermeable to damage when items are placed upon the tonneau system. The one or more skins may be rigid. The one or more skins may have some elastomeric characteristics and may have some give when contacted by other items so that the skin is not damaged. The one or more skins may be made of aluminum; wood; a fibrous material (e.g., an engineered paper product, woven material, fiber glass, carbon fiber, or a combination thereof); polyethylene; fiber reinforced plastic; acrylonitrile butadiene styrene (ABS); thermoplastic olefin (TPO); reinforced polymers; or a combination thereof. The one or more skins may be the coating discussed herein or the one or more skins may be a layer that is added and then a coating applied over the skin. The one or more skins may be in roll form, sheets, or both and then added to the panel core. The one or more skins may be applied by gluing, spraying, dipping, rolling, or a combination thereof. The one or more skins may be on a first side (e.g., exterior surface relative to the cargo box when the tonneau system is in the closed position), a second side (e.g., interior surface relative to the cargo box when the tonneau system is in the closed position), a height (e.g., one or more walls that extend between the first surface and the second surface), or a combination thereof. The one or more skins may assist in sealing a connection region when the panel is placed into a panel region of a frame. The one or more skins, the panel core, or both may compress as the panel is moved into the frame and then the one or more skins, the panel core, or both may expand to seal the connection region to prevent fluid from entering between the frame and the panel.

The connection region may function to connect two or more pieces of the tonneau system together. The connection region may connect a frame to a panel, a hinge to a frame, or both. The connection region may have one part of the tonneau system inserted into another part of the tonneau system. The connection region may be any region where two parts come together. The connection region may be a region where fluid may enter the tonneau system. The connection region may have one or more gaps that may allow fluid to enter between two or more parts of the tonneau system. The connection region may be sealed, covered by a coating, or both. The connection regions may be internally sealed (e.g., by expansion of the panel core, the skin, a hinge, or a combination hereof) and externally sealed. The connection regions may connect two or more discrete parts together to form a tonneau section or the tonneau system. The connection regions may include one or more connection walls, one or more hinge regions, one or more relief cuts, or a combination thereof.

The one or more relief cuts may function to countersink the frame relative to the panels. The one or more relief cuts may function to create a flush surface between the frame and the panel. For example, an exterior surface of the frame and an exterior surface of the panel may be in a single plane. The relief cut may be an exterior surface, an interior surface, or both of the panel. The relief cut may be an absence of one of the layers of the panel. The relief cut may be a thinned region of one layer of the panel. The relief cut may be a machined surface formed into the panel, a molded depression, a stamped area, or a combination thereof. The relief cuts may have a thickness that is substantially equal to a thickness of the frame. The relief cuts may prevent a step between the panel and the frame. An end of the frame may be in contact with or located proximate to an end of the frame so that fluid is prevented from entering into the connection region between the frame and the panel. An end of the frame may compress a wall of the relief cut so that fluid is prevented from entering between the frame and the wall of the panel (e.g., a vertical wall). The relief cut may have a height (or depth) that is substantially the same as the thickness of the panel. The relief cut may have a height of about 1 mm or more, about 2 mm or more, about 3 mm or more, about 5 mm or more, or about 1 cm or more. The relief cut may have a height of about 10 cm or less, about 7 cm or less, or about 5 cm or less. The relief cuts may have a length that is substantially equal to a length of the frame from the end wall. The relief cut may have a length that is about 0.5 mm or less, about 1 mm or less, or about 2 mm or less than the frame from the end wall so that an end of the frame contacts the wall of the relief cut. Thus, for example, if the length of the frame is about 5 cm, the length of the relief cut may be about 4.5 cm or less so that a terminal end of the frame contacts a wall of the relief cut to prevent fluid from extending through the connection region. The frame when in the relief cut may form an exterior surface, an interior surface, or both of a portion of a panel. The one or more relief cuts may include a compression material and a wall of a frame so that the relief cut assists in forming a seal around the connection region.

The compression material functions to prevent environmental materials from entering into the connection regions, between the hinge and the frame, or both. The compression material may assist in forming a seal. The compression material may be compressed as a panel is being inserted into the frame. The compression material may elastically deform so that the panel may be inserted into the frame. The compression material may expand to fill gaps or voids so that the compression material prevents fluid from entering between the panel and the frame. The compression material may be made of foam, an open sell foam, a closed cell foam, a natural rubber, a synthetic rubber, a single part reactive chemical applied in liquid form, a multi part reactive chemical applied in liquid form, polyurethane, polyethylene, cross-linked polyurethane, reticulated polyurethane foam, polyvinyl chloride (PVC), rubber, glue, or a combination thereof. The compression material may bond to or be bonded to the panel, the frame, or both so that the panel and frame are connected together via the compression material, an adhesive, or both The one or more frames may function to connect one or more panels to a hinge, two tonneau sections together, or both. The one or more frames may connect to a panel on one side (e.g., a panel region) and a hinge on a second side (e.g., a hinge region). The one or frames may receive all or a portion of the hinge, the frame, or both. The one or more frames may extend along a first surface, a second surface, or both of the panel, the hinge, or both. The frame may have a "U"-shape, a "C"-shape, a "H"-shape, or a combination thereof. The frame may be made of metal, plastic, a polymer, an extruded material, a stamped material, or a combination thereof. The frame may be made of aluminum, titanium, steel, stainless steel, or a combination thereof. The frame may include one or more connectors. Preferably, the frame includes two or more connectors that are located back to back.

The connectors may function to connect the frame to a panel, a hinge, or both. The one or more connectors may be separated by an end wall. Each frame preferably has at least two connectors. The end wall of the connector may be an end wall of both a panel region and a hinge region of the frame. The connectors may connect the frame to the panel, connect the frame to the hinge, or both. The connectors may extend into a portion of the panel, the hinge, or both. The connector may hold the panel and the frame together. The connector may include one or more walls, an end wall, or a combination thereof of that receive the panel, the hinge, or both.

The walls function to retain a panel in place, a hinge in place, or both. The walls function to connect to a portion of a panel, a portion of a hinge, or both. The walls may be generally parallel to each other. The walls may be substantially rigid. The walls may have some flexibility. The walls may diverge towards each other to hold the panel, the hinge, or both. The walls may be bonded to the panel, the hinge, or both. The walls may create a friction fit with the panel, the hinge, or both. The walls may have an open end and a closed end. The walls may terminate at an end wall.

The end wall may separate the panel (e.g., panel region) and the hinge (e.g., hinge region). The end wall may prevent the panel, the hinge, or both from being moved in a first direction. The end wall may be perpendicular to the walls. The end wall may connect to the panel, the hinge, or both. The end wall may extend generally parallel to one or more connection walls.

The one or more connection walls function to grip or retain a hinge, a panel, or both. The connection walls may be a portion of a wall angled from a first direction to a second direction. For example, the one or more connection walls may be curved inward along a radius so that the first wall and the second wall extend towards each other. The one or more connection walls when curved towards each other may have a space therebetween. A hinge may extend through the space between two connection walls and have a portion located on a first side of the connection walls and a portion on a second side of the connection walls. The connection walls may prevent the hinge from being removed from frame. The connection walls may extend inward from the walls. The connection walls may be a terminal part of the frame. The connection walls may be in intermediate part of the frame. The connection walls may be a discrete wall that extends inward from a wall. Preferably, a connection wall connected to an external wall curves inwards and a connection wall connected to an internal wall is located inward from a terminal end of the internal wall. The connection walls may be located between one or more fingers and the end wall.

The one or more fingers may function to support the hinge, contact a support of the hinge, or both. The one or more fingers may have a cantilevered connection. The one or more fingers may extend from an interior wall, an exterior wall, or both. Preferably, the one or more fingers may extend from an interior wall of the frame towards the exterior wall of the frame. The one or more fingers may curve upward into contact with the hinge or a support of the hinge to maintain the hinge in a planar manner, prevent sagging, or both. The one or more fingers may extend from a first frame towards a second frame and then upward into contact with a hinge and a second of the one or more fingers may extend from a second frame towards a first frame and then upward into contact with the hinge. The one or more fingers may directly contact the hinge. Preferably, the one or more fingers directly contact a support of a hinge. The one or more fingers may extend from the hinge region of the frame. The one or more fingers may extend in a direction opposite the panel region.

The panel region functions to receive a panel and connect the panel to the frame. The panel region may extend around an interior surface, an exterior surface, or both of the panel. The panel region may connect to the panel. The panel region may be adhered to a panel. The panel region be located on a side of the frame opposite the hinge region.

The hinge region may function to connect a portion of the hinge to the frame. The hinge region may extend around an interior surface, an exterior surface, or both of the hinge. The hinge region may connect to the hinge. The hinge region may create a friction fit with the hinge. The hinge region may be adhered to the hinge. The hinge region may connect a frame to a first side of a hinge and a second frame to a second side of the hinge. The hinge region when connected to a hinge may include a connection region.

The one or more hinges may function to connect two or more tonneau sections together. Preferably, the one or more hinges each connect one tonneau section to a directly adjacent tonneau section. The one or more hinges may be hidden from view when the tonneau sections are in a closed position. A portion of the one or more hinges may be visible in the closed position, the stored position, or both. The one or more hinges may function to permit one section to rotate relative to another section. The one or more hinges may prevent one section from contacting a second section, a third section, or both when the sections are in a stored position. The one or more hinges may permit one tonneau section to move longitudinally, rotationally, or both relative to another tonneau section, but to remain connected to the tonneau section. The hinge may permit movement in one or more planes. Preferably, the hinge permits movement in two or more planes in series or in parallel. The one or more hinges may assist in moving a tonneau section from a closed position to an open position. Preferably, the one or more hinges may assist in moving a tonneau section from a stored position (e.g., an open position) to a closed position. Even more preferably, the one or more hinges may assist in moving the one or more tonneau sections from a partially rotated position to a closed position. The one or more hinges may prevent the tonneau sections from moving laterally (i.e., side to side). The one or more hinges may extend from one section to another section and vertically support the sections so that a gap is created between the sections. The hinges may be located on a driver side, a passenger side, a middle, one or more side regions, one or more central regions, or a combination thereof. Preferably, at least a first side region and a second side region include a hinge. The hinge may extend between and be connected to two tonneau sections. The hinge may include one or more connector portions.

The one or more connector portions function to connect an end of the hinge to the hinge region of the panel. The one or more connection portions may have a generally square cross-section. The one or more connection portions may have a narrow region. The one or more connection portions may have portions may have a "T" shaped portion or an "H" shaped portion. The one or more connection portions may have a portion that is located within the hinge region and a portion that is located outside of the hinge region. The one or more connector portions may extend into the hinge region so that the hinge is connected to the frame. Preferably, the one or more connector portions are located inside the hinge region. The one or more connector portions may be located inside of the connection wall. The one or more connector portions may be connected to one or more notched portions.

The one or more notched portions may function to connect the hinge to the frame. The one or more notched portions may function to receive one or more connection walls to connect the hinge to the frame. The one or more notched portions may prevent the hinge from being removed from the frame, the hinge region, or both. The one or more notched portions may be an absence of material. The one or more notched portions may create a friction fit with the connection wall. The one or more notched portions may receive the connection wall so that a connector portion is located on a first side of the connection wall and the hinge joint is located on a second side. The one or more notched portions may be located adjacent to the supports.

The one or more supports may function to assist in preventing the flexible region, the hinge joint, or both of the hinge from sagging. The one or more supports may extend from a lower surface of the flexible region, the hinge joint, or both so that the hinge joint, the flexible region, or both are maintained in a planar relationship. The one or more supports may be contacted by one or more fingers so that the hinge is supported. The one or more supports may be located on a bottom side of the flexible region.

The one or more flexible regions function to assist the tonneau system from moving between a stored position and a closed position. The flexible region may move so that one or more panels move from in plane with each other to parallel to each other. The one or more flexible regions may rotate by about 90 degrees or more or about 180 degrees or more and about 270 degrees or less. When one flexible region is present the flexible region may rotate by about 180 degrees. When two flexible regions are present together the flexible regions may each rotate by about 90 degrees. The one or more flexible regions may be hinge joint that the hinge, the panels, or both rotate about.

The one or more hinge joints may function to be a pivot point that the flexible region, the hinge, the panels, or a combination thereof rotate about. The one or more hinge points may be a thinned area where the hinge moves, fold, bend, or a combination thereof. Each hinge may have a single hinge joint that the hinge rotates about. Each hinge may have a plurality hinge points that the hinge bend about so that the panels may be rotated from in plane to a second plane parallel to the plane. The hinge joints may be formed in predetermined locations. The hinge joints may be formed by thinning one or more regions of the hinge.

The one or more thinned regions may function to permit movement of the panels relative to each other. The one or more thinned regions may permit one tonneau section to be stored above a second tonneau section. The one or more thinned regions may be an absence of material where a coating is applied so that the hinge and coating may be moved and/or folded without damaging the hinge or coating. The one or more thinned regions may be free of contact with a coating. The one or more thinned regions may be a reduction in material in a specification region relative to the surrounding regions so that a weakened location is formed. The one or more thinned regions may expand along an entire height, length, width, or a combination thereof of the hinge. The one or more thinned regions may be a localized region. The one or more thinned regions may be located in an interior region (e.g., bottom of a hinge (i.e., a side that faces the bed)). The one or more thinned regions may be located in an exterior region (e.g., a top of a hinge (i.e., a side that faces away from the bed)). The one or more thinned regions may assist the coating is rotating without being damaged. The hinge may include one or more thinned regions, one or more hinge relieves, or both.

The one or more hinge reliefs may function to assist the hinge is moving, closing, rotating, or a combination thereof. The one or more hinge reliefs may function to assist the coating in folding, rotating, moving out of plane, or a combination thereof. The one or more hinge reliefs may be in a localized region. The one or more hinge reliefs may extend from one frame to a second frame. The one or more hinge reliefs may be located an exterior region of the hinge. The one or more hinge relieves may be an absence of material in an exterior surface of a hinge. The hinge relief may be a thinning of material, a removal of material, or both. The hinge relief may be a saddle, a U-shape, below a plane, a V-shape, or a combination thereof. The hinge relief may extend between supports. The hinge relief may extend between ends of coating. The hinge relief may receive additional material so that the coating is thicker in the relief. The hinge relief may receive less material so that the coating in the relief may be thinned. The hinge relief may assist the hinge, the coating, or both in bending so that the coating, hinge, or both are free of cracks, failures, stress regions, or a combination thereof. The hinge reliefs may work with the thinned regions so that the hinge and coating rotate when the tonneau sections are moved into a stored position.

One or more coatings may be applied over the one or more panels, the one or more frames, the one or more hinges, or a combination thereof. The one or more coating may be located in a single plane on an exterior surface of the panels, the frame, the hinge, or combination thereof. The one or more coatings may have ends where the coating stops at predetermined locations. Preferably, the coatings extend over the connection regions between the panel and the frame, the frame and the hinge, or both. The coating may be formed of one or more coating materials for protecting the panels from damage. For example, the coating may protect the frame from environmental damage (such as humidity, salt, light, heat, rain, or any combination thereof) or damage from impact or abrasion. The coating may also protect the frame from damage. For example, the coating may prevent water from contacting one or more surfaces of the frame. The coating may also protect the hinge from damage. For example, the coating may protect the hinge from a damage discussed above with respect to the panel and the frame. Additionally, coating may prevent damage to the hinge that would prevent the hinge from functioning (e.g., folding by 90 degrees or more, or by about 180 degrees).

The coating material should adhere to the panel, either directly or with the aid of one or more primers or other adhesion promoters. Preferably the coating material directly adheres to the panel. The adhesion between the coating material and the panel may be characterized by a cohesive failure of about 50% or more, preferably about 75% or more, more preferably about 90% or more, and most preferably about 100%, as measured by ASTM D1002-10. In various aspects of the teaching herein, it may also be preferable for the coating material to also have good adhesion to the frame and/or the hinge. As such, the adhesion between the coating material and the frame or hinge may be characterized by a cohesive failure of about 50% or more, preferably about 75% or more, more preferably about 90% or more, and most preferably about 100%, as measured by ASTM D1002-10.

The coating material preferably includes, or consists of one or more polymers that adhere to the surface of the panel, frame, or hinge (e.g., directly to the panel, frame, or hinge, or to a primer or other adhesion promoter applied to the component). The polymer of the coating material may be formed of monomers or prepolymers that adhere to the surface(s), or may have a functional group that enhances the adhesion. The functional group preferably is a pendant functional group attached to the backbone of the polymer or is an end functional group attached to a chain end.

The coating material should be sufficiently flexible so that it can cover (without adhesion) or coat (with adhesion) and allow the hinge to repeatedly flex from an open to closed position. For example, the coating material should not tear or otherwise fail after repeated opening and closing of the hinge for about 100 cycles, for about 500 cycles, for about 1000, cycles, or for about 2000 cycles. If the coating material is too stiff, it may have a brittle failure or may plastically deform during the opening and closing of the hinge. Preferably the coating material is selected so that it has a durometer of about 55 Shore D or less, about 50 Shore D or less, about 45 Shore A or less, about 80 Shore A or less, or about 75 Shore A or less, as measured according to ISO 868, at 23° C., at 15 seconds of contact. If the coating material is too flexible it may fail by tearing. Preferably the coating material is selected so that it has a durometer of about 40 Shore A or more, about 50 Shore A or more, or about 60 Shore A or more. The coating material should be selected to have a generally high elongation at failure so that it able to withstand the required stretching in the hinge region. Preferably, the coating material has an elongation at failure of about 80% or more, about 100% or more, about 120% or more, and more preferably about 150% or more, as measured according to ASTM D412 at 23° C. The coating material typically has an elongation at failure of about 500% or less, however higher elongation at failure is also possible. The coating material may be sufficiently flexible so that when the coating material is applied to a panel, a hinge, a frame, or a combination thereof the coating may be folded by about 90 degrees or more, about 135 degrees or more, or even about 180 degrees or more without cracking. The coating material when applied to a panel, a hinge, a frame, or a combination thereof may be folded by about 270 degrees or less or about 200 degrees or less without cracking.

The coating material preferably is sufficiently stiff so that it provides good protection against impact and abrasion. For example, the coating material may be characterized by a tensile stress at 100% elongation of about 0.5 MPa or more, about 2 MPa or more, about 4 MPa or more, or about 6 MPa or more, as measured according to ASTM D412 at 23° C. The coating material preferably has a stiffness that is sufficiently low so that the resistance to the opening and closing of the hinge does not cause difficulty in operating the hinge. For example, the coating material may be characterized by a tensile stress at 100% elongation of about 30 MPa or less, about 18 MPa or less, about 12 MPa or less, or about 10 MPa or less.

The coating material preferably is substantially or entirely free of high melt temperature polymers having a generally high melting temperature (e.g., greater than about 90° C., greater than about 110° C., greater than about 130° C., or greater than about 150° C.). If present, the amount of the high melt temperature polymer preferably is about 35 weight percent or less, about 25 weight percent or less, about 15 weight percent or less, about 5 weight percent or less, or about 0 weight percent, based on the total weight of the one or more polymers in the coating material. The melting temperature may be measured by differential scanning calorimetry at a heating rate of about 10° C./min.

The coating material preferably is substantially or entirely free of high glass temperature polymers having a generally high glass transition temperature (e.g., greater than about 50° C., greater than about 70° C., greater than about 110° C., or greater than about 130° C.). If present, the amount of the high glass transition temperature polymer preferably is about 35 weight percent or less, about 25 weight percent or less, about 15 weight percent or less, about 5 weight percent or less, or about 0 weight percent, based on the total weight of the one or more polymers in the coating material. The glass transition temperature may be measured using dynamic mechanical testing at a heating rate of about 10° C./min and an amplitude of about 5%.

The polymer of the coating material may include a thermoplastic polymer or a cross-linked polymer. As used herein, a cross-linked polymer is a polymer having a sufficient amount of cross-links so that it does not flow, even when heated to at least 50° C. above its glass transition temperature and melting temperature. The cross-linked polymer may be present in the coating material in an amount of about 30% or more, about 50 weight percent or more, about 70 weight percent or more, about 90 weight percent or more, or about 100 weight percent, based on the total weight of the one or more polymers.

The coating material may include additional components in addition to the one or more polymers. The coating material may include one or more catalysts or cross-linking agents. The coating material may include one or more fillers. The one or more fillers may include reinforcing filler(s) and/or non-reinforcing filler(s). The coating material may include one or more stabilizers, such as a light stabilizer, a heat stabilizer, a stabilizer to reduce damage from exposure to salt, ozone, or exhaust gases, or a process stabilizer. The coating material may include one or more colorants (e.g., black or other color). The coating material may include one or more inhibitors that inhibits the cross-linking of the coating material until after it is applied to a surface. The coating material may include one or more flow modifiers to adjust the viscosity of the coating material before cross-linking. For example, the flow modifier may be an organic or inorganic material that increases or decreases the viscosity of the coating material (or a portion of the coating material) before cross-linking. The amount of the one or more polymers in the coating material preferably is about 25 weight percent or more, more preferably about 40 weight percent or more, and most preferably about 60 weight percent or more, based on the total weight of the coating material. The amount of the one or more polymers may be about 100 weight percent or less, or about 95 weight percent or less, based on the total weight of the coating material.

The coating material preferably is formed by a coating material composition that cross-links at a sufficient speed so that it has a gel time of about 30 minutes or less at about 23° C. Preferably the gel time is about 20 minutes or less, more preferably about 10 minutes or less, even more preferably about 5 minutes or less and most preferably about 3 minutes or less. The gel time may be about 10 seconds or more, about 20 seconds or more, about 30 seconds or more, or about 45 seconds or more.

The coating material composition may be provided as a single part that forms the cross-linked coating material or as two or more parts that when combined forms the cross-linked coating material. For example, the coating material composition may include or consist of an A part and a B part which react to form the cross-linked coating material. The A part and the B part preferably have similar viscosities so that they can be easily mixed. For example, the ratio of the higher viscosity part to the lower viscosity part may be about 50 or less, about 10 or less, about 5 or less, about 4 or less, about 3 or less, about 2 or less, or about 1. The A part and/or the B part may include one or more flow modifiers (such as discussed herein) and/or include polymers, monomers or prepolymers selected to achieve the desired viscosity ratio. For example, the viscosity of a component may be adjusted by adjusting the molecular weight of a polymer or prepolymer in the part. The A part may include a first compound and the B part may include a second compound that react to form the cross-links. The first compound and/or the second compound is a polymer, a prepolymer, or a monomer. Preferably, the first compound and the second compound are each a polymer, a prepolymer, or a monomer. The multi-part composition preferably is shelf sable (e.g., at a temperature of about 30° C.) for about 1 month or more, about 3 months or more, about 6 months or more, or about 12 months or more. One or a multi-functional compound having a functionality greater than 2, for forming the cross-links. The first compound and/or the second compound may be the multi-functional compound, or the multi-functional compound may be present as an additional compound in the A part, the B part, or an additional part.

A particularly preferred coating material composition includes one or more monomers, prepolymers, or polymers having at least two isocyanate groups, at least two amine groups, at least two imide groups, at least alcohol containing groups, or at least two alkoxy groups available for reacting. The coating material composition preferably includes different monomers, prepolymers, or polymer having functional groups that react to form the cross-linked coating material. For example, the first compound or the second compound may be a compound containing at least two isocyanate groups and the other compound may be a compound having at least two functional groups capable of reacting with the isocyanate groups. The coating material may include a polymer having urea linkages (e.g., a polyurea). The polyurea may be formed from the cross-linking reaction of an isocyanate (e.g., polyisocyanate compound) and an amine (e.g., a polyamine compound). The coating material may include a polymer having carbamate linkages (e.g., a polyurethane). The polyurethane may be formed from the cross-linking reaction of an isocyanate (e.g., a polyisocyanate compound) and an alcohol (e.g., a polyol). The coating may be a single layer (e.g., a monolithic coating) that is applied over the entire exterior surface of the foldable tonneau system. The coating may be a plurality of discrete layers that are applied over predetermined regions so that there are ends where the coating stops and then begins again with gaps there between.

The ends function to provide flexibility to the coating in high stress regions. The ends function to stop once a connection region is covered. The ends may stop before a thinned region, a hinge relief, the hinge, or a combination thereof. The ends may stop on the frame. The ends may stop before the hinge. The ends may stop on the hinge. The ends may be separated by one or more gaps.

The one or more gaps may be a region between two or more ends of a coating. The one or more gaps may be a high stress region that is free of a coating. The gap may be a region of a hinge that rotates. The gaps may be located above a hinge region.

The one or more hinge regions may function to bend, fold, rotate, or a combination thereof. The one or more hinge regions may be movable. The one or more hinge regions may fold about 90 degrees or more, about 180 degrees or more, or about 270 degrees or less. The one or more hinge regions may support one tonneau section over another tonneau section. The one or more hinge regions may be free of a coating. The one or more hinge regions may be partially coated by a coating. The one or more hinge regions may include the thinned region, the hinge relief, or both. The one or more hinge regions may be a coating that is folded, bent, or both. The one or more hinge region coatings may be prestressed upon being applied to the hinge so that the coating is movable about the pre-stressed regions. The hinge regions of the coating may be area between the frames. The hinge regions of the coating may following the contours of the hinge, thus, if the hinge has a hinge relief then the coating may have a relief.

The relief functions to assist the coating is moving, bending, folding, or a combination thereof without failing. The relief may have a thickness that is less than the thickness surrounding the relief (e.g., outside of the hinge regions). The relief may have a same thickness as the thickness in the surrounding regions. The relief may have a pre-bend so that the coating in the relief folds less than if the relief was not present. The relief of the coating may mirror the shape or be complementary to the shape of the hinge relief.

The coating may be applied to the panel, frame, hinge, or a combination thereof by one or more method discussed herein. The coating may be applied by spraying the coating over the panels, the frame, the hinge, or a combination thereof. The coating may be sprayed on like a spray on bed liner or may be a spray on bed liner material. The coating may be sprayed on over the panels individually. The coating may be sprayed on the panels and frame when the panels and frame are connected together. The coating may be sprayed on the panels, frame, and hinge when they are all connected together. The coating may have a viscosity so that some of the coating may enter into the connection region of the tonneau system. Once applied the coating may permanently bond to the frame, hinge, panel, or a combination thereof. The method may include a step of curing the coating with moisture, heat, ultraviolet, time, or a combination thereof. The method may include a step of moving the panel, the hinge, the frame or a combination thereof to introduce the coating into the connection regions. An air knife, roller, blade, or a combination thereof may meter the amount of coating applied, smooth the coating, or both.

FIG. 1 is a side view of a vehicle 2 having a cargo box 4 with a foldable tonneau system 10 in a closed position 110 so that the cargo box 4 is covered. The foldable tonneau system 10 includes a plurality of tonneau sections 12 with each tonneau section 12 including a panel 10 that are connectable together and movable via hinges 50.

Figure 2:
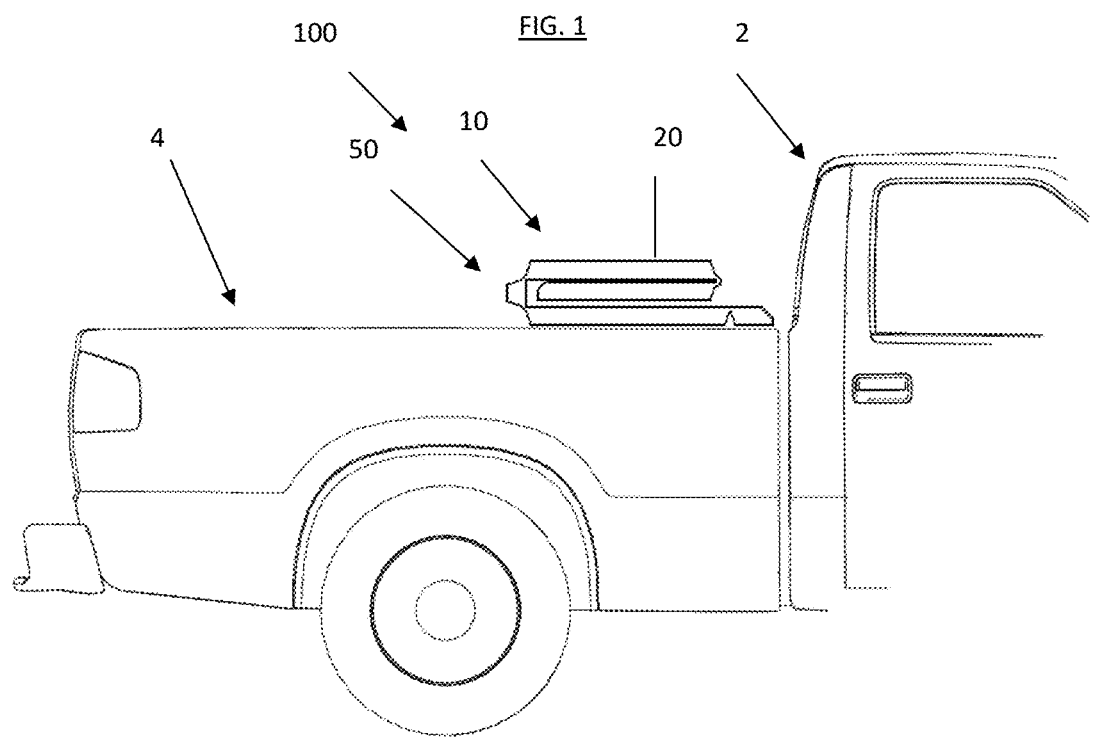
FIG. 2 is side view of a tonneau cover on a vehicle with the tonneau cover being in the stored position.

FIG. 2 is as side view of the foldable tonneau system 10 in a stored position 100 so that the cargo box 4 of the vehicle 2 is exposed. The plurality of panels 20 are folded upon themselves via the hinges 50.

Figure 3:
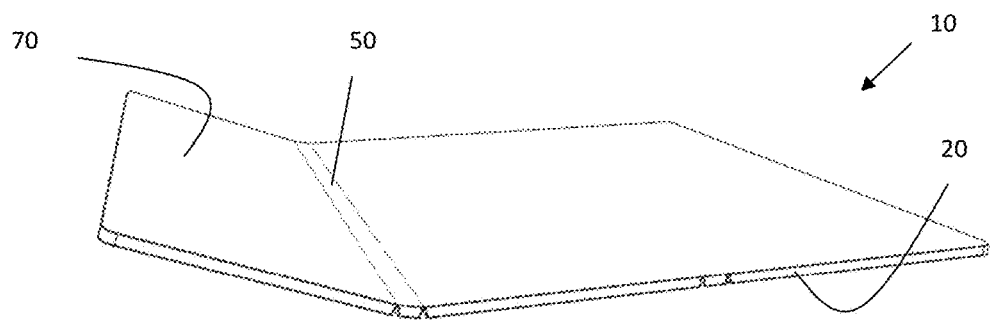
FIG. 3 is a perspective view of tonneau cover with a tonneau section being folded.

FIG. 3 is a perspective view of a foldable tonneau system 10 being partially folded about a hinge 50. The foldable tonneau system 10, as shown, includes panels 20 and hinges 50 that covered by a coating 70.

Figure 4:
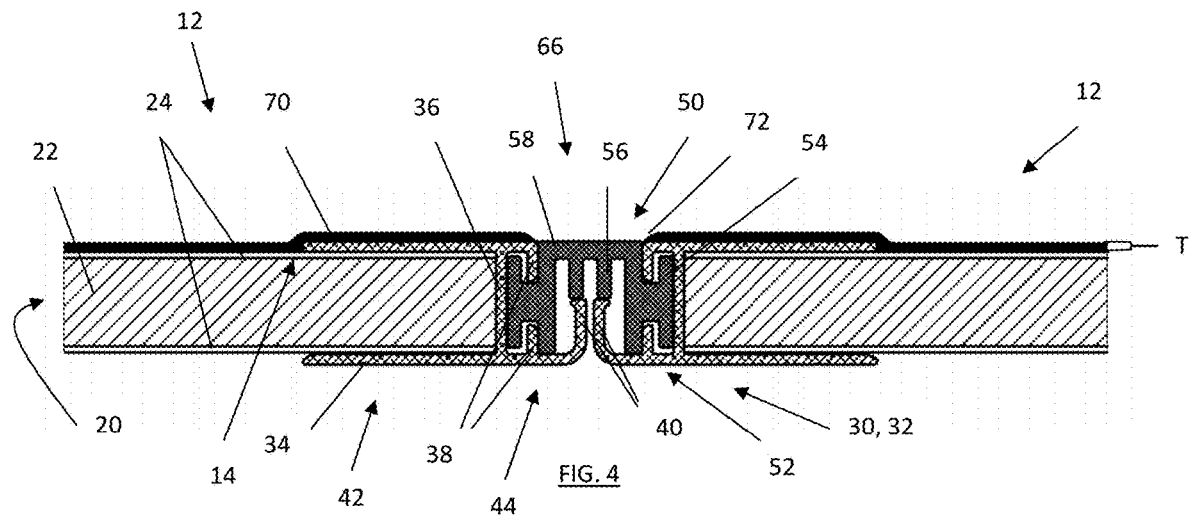
FIG. 4 is a close-up view of a frame with a hinge connecting two panels with a coating applied over the frame and panel.

FIG. 4 is a side view of two tonneau sections 12 connected via a hinge 50. Each tonneau section 12 includes a panel 20. The panel 20 includes a panel core 22 that is covered on both a first side and a second side by a skin 24. The panel 20 extends into a panel region 42 of the frame 30, which doubles as a connector 32. The frame 30 includes walls 34 that extend along both the first side and the second side of the panel 20 when the panel 20 is inserted into the frame 30. The panel 20 is inserted into the frame 30 until the panel 20 contacts an end wall 36. The frame 20 has a hinge region 44 that connects to the hinge 50. The hinge region 44 includes a pair of opposing connection walls 38 that extend towards each other to extend into a notched portion 54 in the connector portion 52 of the hinge 50. The frame 30 also includes a pair of fingers 40 that extends towards and into contact with the supports 56 of the flexible region 58 of the hinge 50 so that the hinge 50 remains planar in the closed position. A coating 70 extends over the panel 20 and the frame 30. The coating 70 has ends 72 that stop before the coating reaches the flexible region 58 so that the coating is not flexed with the hinge 50 and a gap 66 is formed between the ends 72. The coating 70 extends over a connection region 14 where the panel 20 is joined to the frame 30 and then has an end 72 that stops before reaching the hinge 50.

Figure 5:
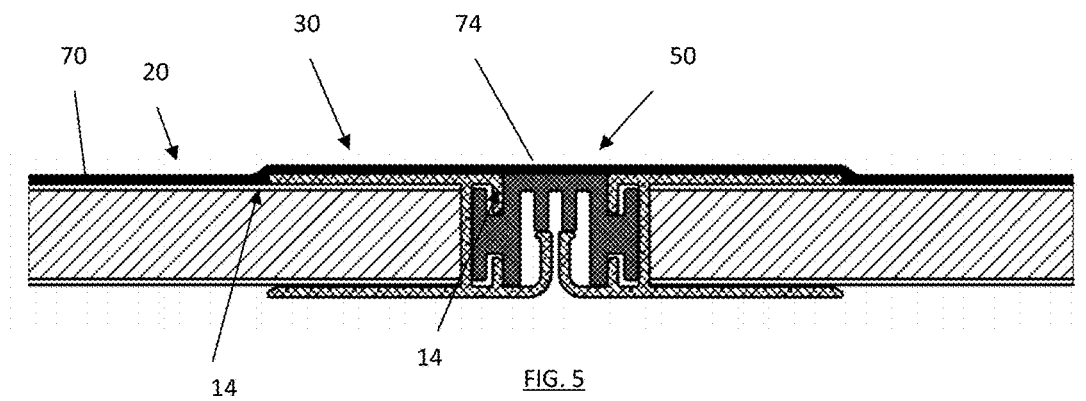
FIG. 5 is a close-up view of a frame with a hinge connecting two panels with a coating applied over the frame, panel, and hinge.

FIG. 5 illustrates two panels 20 being connected to a hinge 50 via two frames 30. A coating 70 covers the two panels 20, the hinge 50, and the frames 30. The coating 70 has a hinge region 74 that flexes with the hinge 50. The coating 70 extends over the connection region 14 where the panel 20 connects to the frame 30 and where the frame 30 connects with the hinge 50.

Figure 6:
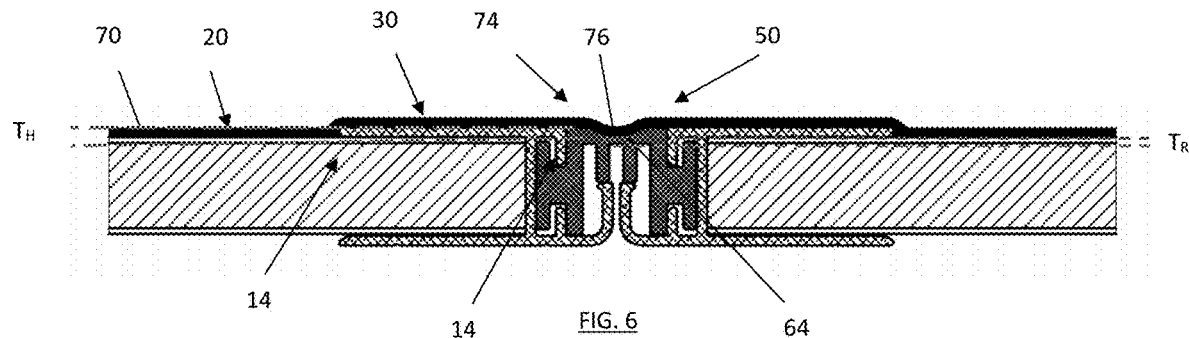
FIG. 6 is a close-up view of a frame with a hinge connecting two panels with a coating applied over the frame, pane, and hinge with a relief in the hinge.

FIG. 6 illustrates two panels 20 being connected to a hinge 50 via two frames 30. A coating 70 covers the two panels 20, the hinge 50, and the frames 30. The hinge 50 includes a hinge relief 64 that the coating 70 extends into forming a relief 76 in the hinge region 74 that flexes with the hinge 50. The hinge 50 has a thickness ($T_H$) and the relief 76 of the hinge 50 has a thickness ($T_R$) which is less than the thickness of the hinge 50. The coating 70 extends over the connection region 14 where the panel 20 connects to the frame 30 and where the frame 30 connects with the hinge 50.

Figure 7:
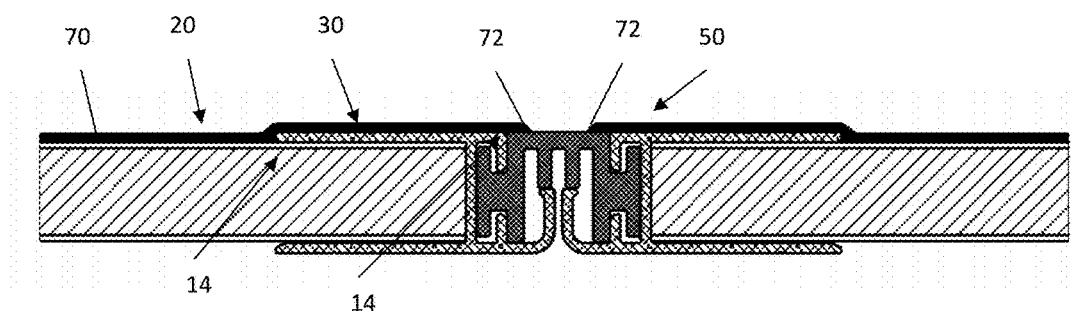
FIG. 7 is a close-up view of a frame with a hinge connecting two panels with a coating applied over the frame, panel, and a portion of the hinge.

FIG. 7 illustrates two panels 20 being connected to a hinge 50 via two frames 30. A coating 70 covers the two panels 20, the hinge 50, and the frames 30, but the coating 70 includes ends 72 that do not connect so that the hinge 50 is movable without all of the coating being moved. The coating 70 extends over the connection region 14 where the panel 20 connects to the frame 30 and where the frame 30 connects with the hinge 50 and then the coating has two ends 72 that stop on the hinge 50 before connecting.

Figure 8:
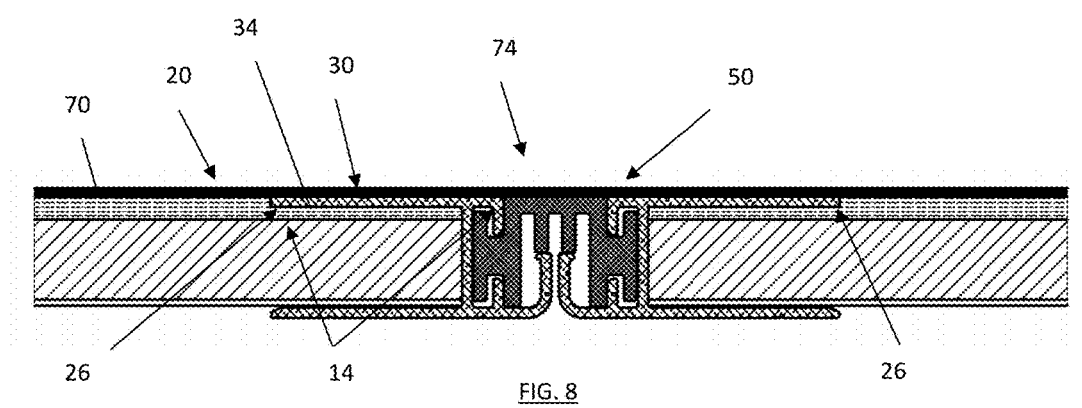
FIG. 8 is a close-up view of a frame with a hinge connecting two panels with a coating applied over the frame, panel, and hinge with a recess in the panel.

FIG. 8 illustrates two panels 20 being connected to a hinge 50 via two frames 30. The panel 20 include a relief cut 26 that receives a portion a wall 34 of the frame 30 so that the hinge 50, frame 30, and panel 20 all form a single plane. A coating 70 covers the two panels 20, the hinge 50, and the frames 30 and the coating 70 extends in a single plane. The coating 70 has a hinge region 74 that flexes with the hinge 50. The coating 70 extends over the connection region 14 where the panel 20 connects to the frame 30 and where the frame 30 connects with the hinge 50.

Figure 9:
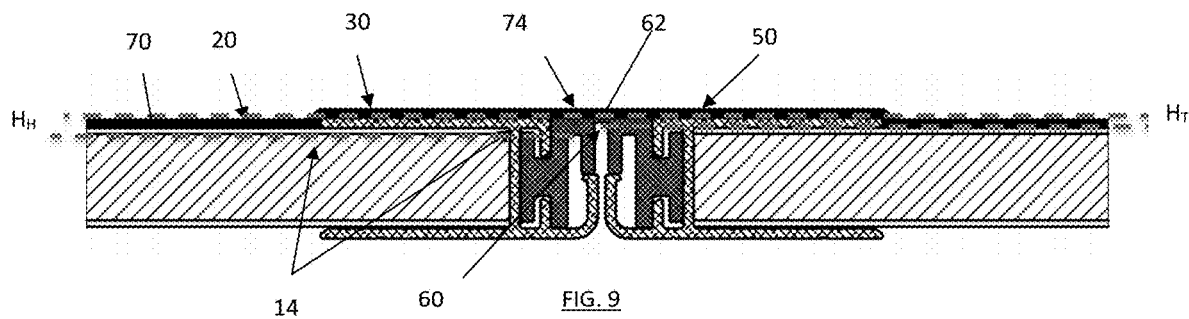
FIG. 9 is a close-up view of a frame with a hinge connecting two panels with a coating applied over the frame, panel, and hinge with a thinned region in the hinge.

FIG. 9 illustrates two panels 20 being connected to a hinge 50 via two frames 30. A coating 70 covers the two panels 20, the hinge 50, and the frames 30. The coating 70 has a hinge region 74 that flexes with the hinge 50. The hinge 50 includes a hinge joint 60 having a thickness ($H_H$), the hinge joint 60 has a thinned region 62 having a thickness ($H_T$) with the thinned region 62 that assists the coating 70 and the hinge 50 is moving as the panels 20 are moved to a stored position. The coating 70 extends over the connection region 14 where the panel 20 connects to the frame 30 and where the frame 30 connects with the hinge 50.

Figure 10:
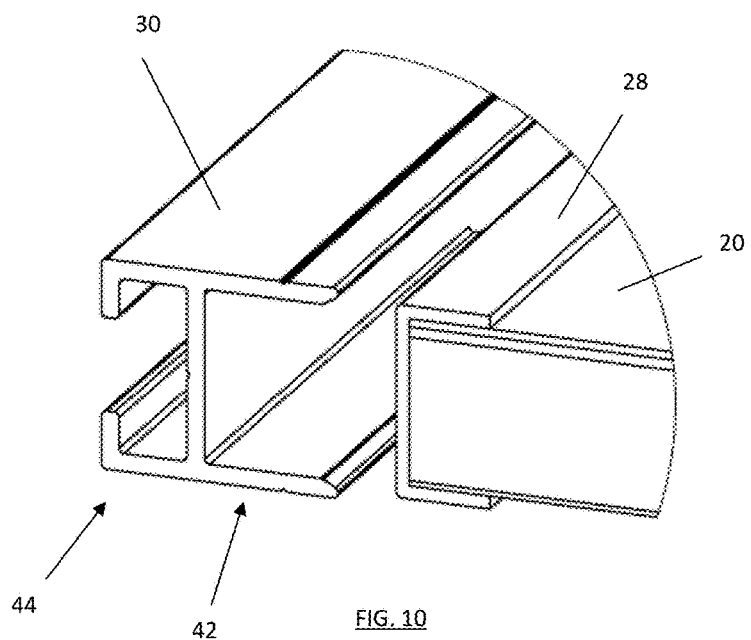
FIG. 10 is an exploded view of a frame and a panel.

FIG. 10 illustrates an exploded view of a panel 20 being inserted into a panel region 42 of a frame 30. The frame 30 includes a hinge region 44 and a panel region 42. The panel 20 includes a compression material 28 that extends around the panel 20 so that when the panel 20 is inserted into the panel region 42 the compression material 28 assists in forming a seal between the panel 20 and the frame 30. Once connected the panel 20 and the frame 30 are covered by a coating (not shown).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Vehicle
4 Cargo box
10 Foldable Tonneau System
12 Tonneau Section
14 Connection region 20 Panel
22 Panel core
24 Skin
26 Relief cut
28 Compression material
30 Frame
32 Connector
34 Wall
36 End wall
38 Connection wall
40 Finger
42 Panel region
44 Hinge region
50 Hinge
52 Connector portion
54 Notched portion
56 Support
58 Flexible region
60 Hinge joint
62 Thinned region
64 Hinge relief
66 Gap
70 Coating
72 End
74 Hinge region
76 relief
100 Stored position
110 Closed position

What is claimed is:

1. A method comprising:
   a. inserting one of a plurality of panels into a panel region of one of a plurality of frames;
   b. inserting a first end of one of a plurality of hinges into a hinge region of the one of the plurality of frames;
   c. inserting a second end of the one of the plurality of hinges into a hinge region of a second of the plurality of frames; and
   d. applying a coating over the one of the plurality of panels and all or a portion of the one of the plurality of hinges and all or a portion of the second of the plurality of frames.

2. The method of claim 1, wherein the method includes a step of applying the coating over all or a portion of one or more of the plurality of hinges.

3. The method of claim 1, wherein the method includes a step of forming a relief cut into the plurality of panels.

4. The method of claim 3, wherein the method includes a step of inserting a portion of the one of the plurality of panels into the relief cut.

5. The method of claim 1, wherein the method includes a step of forming a relief, a thinned region, or both into the plurality of hinges and a step of applying a coating over the relief, the thinned region, or both.

6. The method of claim 1, wherein the method includes: applying the coating over a connection region where each of the plurality of panels connect to the one of the plurality of frames.

7. A method comprising:
   attaching a first panel of a tonneau cover to a panel region of a first frame;
   attaching a second panel of the tonneau cover to a panel region of a second frame;
   connecting together the first frame and the second frame with a hinge; and
   applying a coating over the first panel, the second panel, the first frame, and the second frame.

8. The method of claim 7, wherein the method comprises: applying the coating over the hinge.

9. The method of claim 8, wherein the coating is applied over only a portion of the hinge so that a portion of the hinge is free of the coating.

10. The method of claim 9, wherein the portion of the hinge that is free of the coating is generally at a center region of the hinge.

11. The method of claim 7, wherein the coating is free from extending over the hinge.

12. The method of claim 7, wherein the coating extends over the first panel in a first plane, and the coating extends over first frame in a second plane that is different from the first plane.

13. The method of claim 12, wherein the coating extends over the hinge in the second plane.

14. The method of claim 7, wherein the coating extends over the first panel and the first hinge in a common plane.

15. The method of claim 8, wherein the coating over the hinge has a relief.

16. The method of claim 15, wherein the relief is located at a center region of the hinge.

17. The method of claim 7, wherein the first panel has a relief cut that receives a portion of a wall of the first frame, so that the hinge, the first frame, and the first panel are located in a single plane.

18. The method of claim 16, wherein the coating is applied over the first panel, the portion of the wall, and the hinge in a single plane.

19. The method of claim 7, wherein the coating adheres to the first panel.

20. The method of claim 7, wherein the attaching step comprises inserting the first panel of the tonneau cover into a panel region of the first frame.

* * * * *